United States Patent
Choi et al.

(10) Patent No.: US 10,719,263 B2
(45) Date of Patent: Jul. 21, 2020

(54) METHOD OF HANDLING PAGE FAULT IN NONVOLATILE MAIN MEMORY SYSTEM

(71) Applicant: Samsung Electronics Co., Ltd., Suwon-si, Gyeonggi-do (KR)

(72) Inventors: Jung Sik Choi, Suwon-si (KR); Hwan Soo Han, Seoul (KR)

(73) Assignees: Samsung Electronics Co., Ltd., Gyeonggi-do (KR); Research & Business Foundation Sungkyunkwan University, Gyeonggi-do (KR)

(*) Notice: Subject to any disclaimer, the term of this patent is extended or adjusted under 35 U.S.C. 154(b) by 428 days.

(21) Appl. No.: 15/364,628

(22) Filed: Nov. 30, 2016

(65) Prior Publication Data

US 2017/0160991 A1 Jun. 8, 2017

(30) Foreign Application Priority Data

Dec. 3, 2015 (KR) .................. 10-2015-0171507

(51) Int. Cl.
| | |
|---|---|
| *G06F 12/00* | (2006.01) |
| *G06F 3/06* | (2006.01) |
| *G06F 11/07* | (2006.01) |
| *G06F 11/00* | (2006.01) |

(52) U.S. Cl.
CPC .......... *G06F 3/0659* (2013.01); *G06F 3/0619* (2013.01); *G06F 3/0653* (2013.01); *G06F 3/0679* (2013.01); *G06F 11/00* (2013.01); *G06F 11/073* (2013.01)

(58) Field of Classification Search
CPC .... G06F 3/0659; G06F 3/0619; G06F 3/0653; G06F 3/0679; G06F 11/00; G06F 11/073
See application file for complete search history.

(56) References Cited

U.S. PATENT DOCUMENTS

| | | | |
|---|---|---|---|
| 4,718,008 A | 1/1988 | Chang et al. | |
| 4,761,737 A | 8/1988 | Duvall et al. | |
| 5,093,777 A * | 3/1992 | Ryan ................ | G06F 9/383 |
| | | | 711/204 |
| 5,367,656 A * | 11/1994 | Ryan ................ | G06F 12/0862 |
| | | | 711/213 |
| 5,495,591 A * | 2/1996 | Ryan ................ | G06F 12/0862 |
| | | | 707/999.006 |
| 6,151,662 A * | 11/2000 | Christie ............ | G06F 9/30047 |
| | | | 711/134 |
| 6,317,818 B1 | 11/2001 | Zwiegincew et al. | |
| 6,473,757 B1 * | 10/2002 | Garofalakis ....... | G06F 16/2465 |

(Continued)

OTHER PUBLICATIONS

Arkaprava Basu et al. "Efficient Virtual Memory for Big Memory Servers". University of Wisconsin—Madison and Hewlett-Packard Laboratories. ISCA'13 Tel-Aviv. (2013). p. 1-12.

(Continued)

*Primary Examiner* — Prasith Thammavong
(74) *Attorney, Agent, or Firm* — Harness, Dickey & Pierce, P.L.C.

(57) ABSTRACT

A method of handling a page fault occurring in a nonvolatile main memory system including analyzing a pattern of occurrence of the page fault based on the page fault when the page fault occurs, setting the number of pages to be consecutively processed based on analysis result of the analyzing, and consecutively processing as many pages as the number may be provided.

18 Claims, 18 Drawing Sheets

(56) References Cited

U.S. PATENT DOCUMENTS

| | | | |
|---|---|---|---|
| 6,571,318 B1* | 5/2003 | Sander | G06F 12/0862 711/137 |
| 7,139,879 B2 | 11/2006 | Loafman | |
| 8,103,849 B2 | 1/2012 | Hansen | |
| 8,239,610 B2 | 8/2012 | van Riel et al. | |
| 8,977,830 B1 | 3/2015 | Clark | |
| 2005/0021916 A1* | 1/2005 | Loafman | G06F 12/08 711/154 |
| 2006/0069871 A1* | 3/2006 | Gill | G06F 12/0862 711/118 |
| 2007/0055843 A1* | 3/2007 | Lameter | G06F 12/08 711/206 |
| 2008/0104362 A1 | 5/2008 | Buros et al. | |
| 2011/0010521 A1* | 1/2011 | Wang | G06F 12/1027 711/207 |
| 2011/0320749 A1 | 12/2011 | Gonion | |
| 2012/0236010 A1 | 9/2012 | Ginzburg et al. | |
| 2013/0227201 A1 | 8/2013 | Talagala et al. | |
| 2014/0089451 A1 | 3/2014 | Eran et al. | |
| 2014/0189249 A1* | 7/2014 | Ye | G06F 12/0862 711/137 |
| 2014/0304559 A1 | 10/2014 | Ginzburg et al. | |
| 2015/0310580 A1* | 10/2015 | Kumar | G06F 12/1009 345/502 |
| 2016/0077761 A1* | 3/2016 | Stabrawa | G06F 3/0604 711/172 |
| 2016/0197986 A1* | 7/2016 | Chambliss | G06F 9/45558 709/213 |
| 2017/0068624 A1* | 3/2017 | Ash | G06F 12/122 |
| 2017/0147227 A1* | 5/2017 | Stabrawa | G06F 3/0608 |

OTHER PUBLICATIONS

Juan Navarro et al. "Practical, transparent operating system support for superpages". Rice University and Proc. of the 5th Usenix Symposium on Operating Systems Design and Implementation. (Dec. 2002). p. 1-16.

Subramanya R. Dulloor et al. "System Software for Persistent Memory". Intel Labs, Intel Corp., Georgia Institute of Technology, and EuroSys. (2014). p. 1-14.

Thomas W. Barr et al. "Translation Caching: Skip, Don't Walk (the Page Table)". Rice University and ISCA'10. (Jun. 2010). p. 1-12.

* cited by examiner

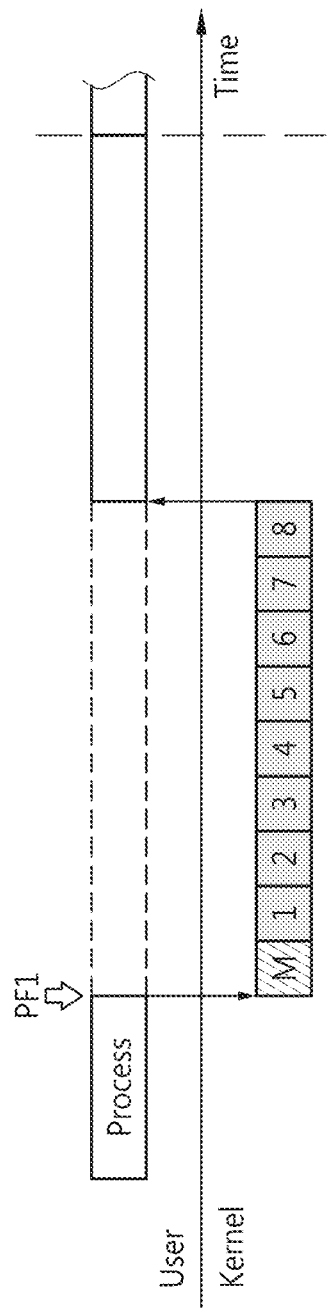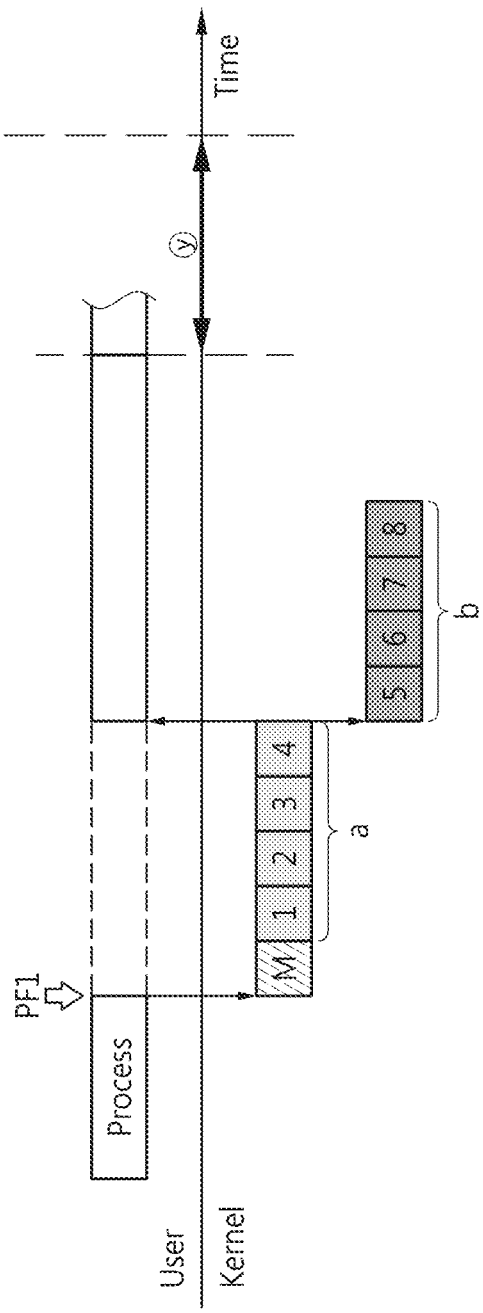
FIG. 11A
FIG. 11B

METHOD OF HANDLING PAGE FAULT IN NONVOLATILE MAIN MEMORY SYSTEM

CROSS-REFERENCE TO RELATED APPLICATIONS

This application claims priority under 35 U.S.C. § 119(a) to Korean Patent Application No. 10-2015-0171507 filed on Dec. 3, 2015, the disclosure of which is hereby incorporated by reference in its entirety.

BACKGROUND

Example embodiments of the inventive concepts relate to methods of handling a page fault in a nonvolatile main memory system, and more particularly, to methods of handling a page fault in a nonvolatile main memory system to reduce overhead caused by occurrence of the page fault.

With changes in computing environment, research to use nonvolatile memory as main memory of a computer system has been conducted. Furthermore, with performance improvements in storage devices, the access latency of a storage device has reached a comparable level to the access latency of a main memory.

In such a changing computing environment, small overhead existing in a computer system can act as a considerably large overhead, and cause problems. An example of such considerably large overhead is a user/kernel mode switching performed by an operating system (OS) when a page fault occurs. To overcome such problems, a method of reducing the number of page faults is desired.

SUMMARY

According to an example embodiment of the inventive concepts, a method of handling a page fault occurring in a non-volatile main memory system includes analyzing a pattern of occurrence of the page fault when the page fault occurs, setting a first number of pages to be consecutively processed based on a result of the analyzing, and consecutively processing as many pages as the first number.

According to an example embodiment of the inventive concepts, a method of handling a page fault occurring in a non-volatile main memory system includes setting a number of pages to be consecutively processed based on a result of analyzing a pattern of occurrence of the page fault when the page fault occurs, synchronously processing some pages as many as the number, and asynchronously processing a rest of the pages.

According to an example embodiment of the inventive concepts, determining whether the page fault has occurred, analyzing, when the page fault has occurred, a pattern of occurrence of the page fault to determine whether the pattern is sequential, setting the first number of pages to be consecutively processed based on a result of the analyzing, and consecutively processing as many pages as the first number.

BRIEF DESCRIPTION OF THE DRAWINGS

The above and other features and advantages of the inventive concepts will become more apparent by describing in detail example embodiments thereof with reference to the attached drawings in which:

FIG. 11A is a diagram of a method of handling a page fault according to an example embodiment of the inventive concepts;

FIG. 11B is a diagram of a method of handling a page fault according to an example embodiment of the inventive concepts;

DETAILED DESCRIPTION

With the recent development of manufacturing processes for producing semiconductor memory, functions of the semiconductor memory have been rapidly improved. For example, nonvolatile memory has reached a level of replacing existing volatile main memory or sub memory in terms of performance indices such as read latency, write latency, addressability, and/or endurance.

Hereinafter, the description will be made based on the premise that systems according to some example embodiments of the inventive concepts have the following technical features, which reflects technical developments in nonvolatile memory. Firstly, systems according to some example embodiments of the inventive concepts include a main memory formed of nonvolatile memory instead of volatile memory. Here, the nonvolatile memory may include persistent memory. Secondly, the nonvolatile main memory may function as sub memory and is thus able to store a file system therein. Furthermore, when a program stored in the sub memory is executed, an entirety of the program can be loaded to the nonvolatile main memory. At this time, page replacement according to a demand paging scheme may not occur during the operation of a nonvolatile main memory system according to some example embodiments of the inventive concepts.

Figure 1:
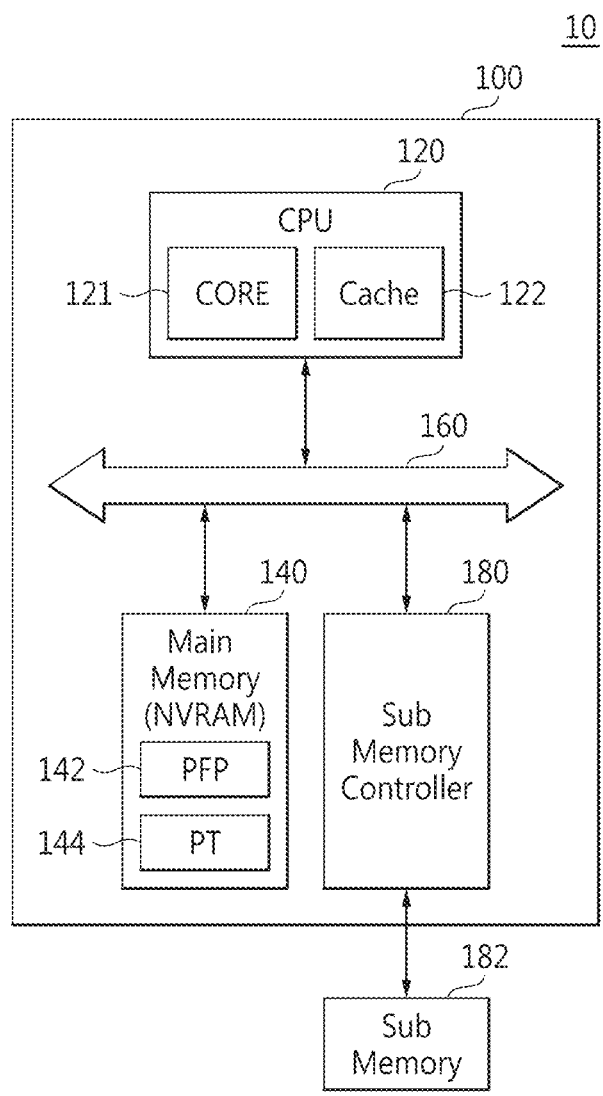
FIG. 1 is a block diagram of a nonvolatile main memory system according to an example embodiment of the inventive concepts.

FIG. 1 is a block diagram of a nonvolatile main memory system 10 according to an example embodiment of the inventive concepts. The nonvolatile main memory system 10 may include a computing system 100 and a sub memory 182.

The computing system 100 may include a central processing unit (CPU) 120, a nonvolatile main memory 140, a bus 160, and a sub memory controller 180. The CPU 120 may include at least one core 121 and a cache 122. The nonvolatile main memory 140 may include a page fault processor (PFP) 142 and a page table (PT) 144.

The CPU 120 may control the overall operation of the nonvolatile main memory system 10 under the control of an operating system (OS). The CPU 120 may use the core 121 and the cache 122 to control the overall operation of the nonvolatile main memory system 10.

The CPU 120 may control the overall operation of the nonvolatile main memory system 10 to perform memory mapping between pages of virtual memory and frames of physical memory. Here, the pages may be blocks of certain size into which a storage space of the virtual memory is divided; the frames may be blocks of certain size into which a storage space of the physical memory is divided. The physical memory may be the nonvolatile main memory 140.

The CPU 120 may store a result of the memory mapping between the pages and the frames in the PT 144. The CPU 120 may input a new memory mapping result to the PT 144 or may erase the existing memory mapping result from the PT 144.

The CPU 120 may also perform file input/output (I/O). Further, the CPU 120 may perform memory mapped file I/O using the memory mapping. When the CPU 120 performs file I/O using the memory mapping, memory copy overhead caused by general file I/O can be avoided.

Meanwhile, in order to execute a program stored in sub memory, the program is loaded to main memory. Accordingly, when a program to be executed has been stored in the sub memory 182 but has not been loaded to the nonvolatile main memory 140, the CPU 120 may control the nonvolatile main memory system 10 to load an entirety of the program from the sub memory 182 to the nonvolatile main memory 140. The nonvolatile main memory 140 may retain data even without power supply and may input/output the data. The data may refer to a program under execution and/or data required by the program.

The nonvolatile main memory 140 may include electrically erasable programmable read-only memory (EEPROM), flash memory, magnetic random access memory (MRAM), spin-transfer torque MRAM, ferroelectric RAM (FeRAM), phase-change RAM (PRAM), resistive RAM (RRAM), nanotube RRAM, polymer RAM, nano floating gate memory (NFGM), holographic memory, molecular electronics memory device, or insulator resistance change memory. However, the inventive concepts are not restricted to these examples. The nonvolatile main memory 140 may include persistent memory which retains data even when power is off. The PT 144 included in the nonvolatile main memory 140 may store a result of memory mapping between virtual memory and physical memory.

The sub memory controller 180 may control a data access operation, e.g., a write operation or a read operation, of the sub memory 182 according to the control of the CPU 120. The sub memory controller 180 may be implemented in a chip separated from the CPU 120 or may be implemented as a part of the CPU 120. The sub memory 182 extends the functions of the nonvolatile main memory 140 to permanently preserve a large amount of data.

The computing system 100 may be implemented as a personal computer (PC) or a mobile device, such as a laptop computer, a cellular phone, a smart phone, a tablet PC, a personal digital assistant (PDA), an enterprise digital assistant (FDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone or an e-book, but the inventive concepts are not restricted to these examples.

The components 120, 121, 122, 140, 142, 144, and 180 of the computing system 100 may communicate data with one another through the bus 160. The bus 160 may be implemented as advanced microcontroller bus architecture (AMBA), an advanced high-performance bus (AHB), an advanced system bus (ASB), advanced extensible interface (AXI) coherency extensions (ACE), or a combination thereof, but the inventive concepts are not restricted to these examples. The structure and functions of the PFP 142 will be described in detail with reference to FIG. 6 later.

Figure 2:
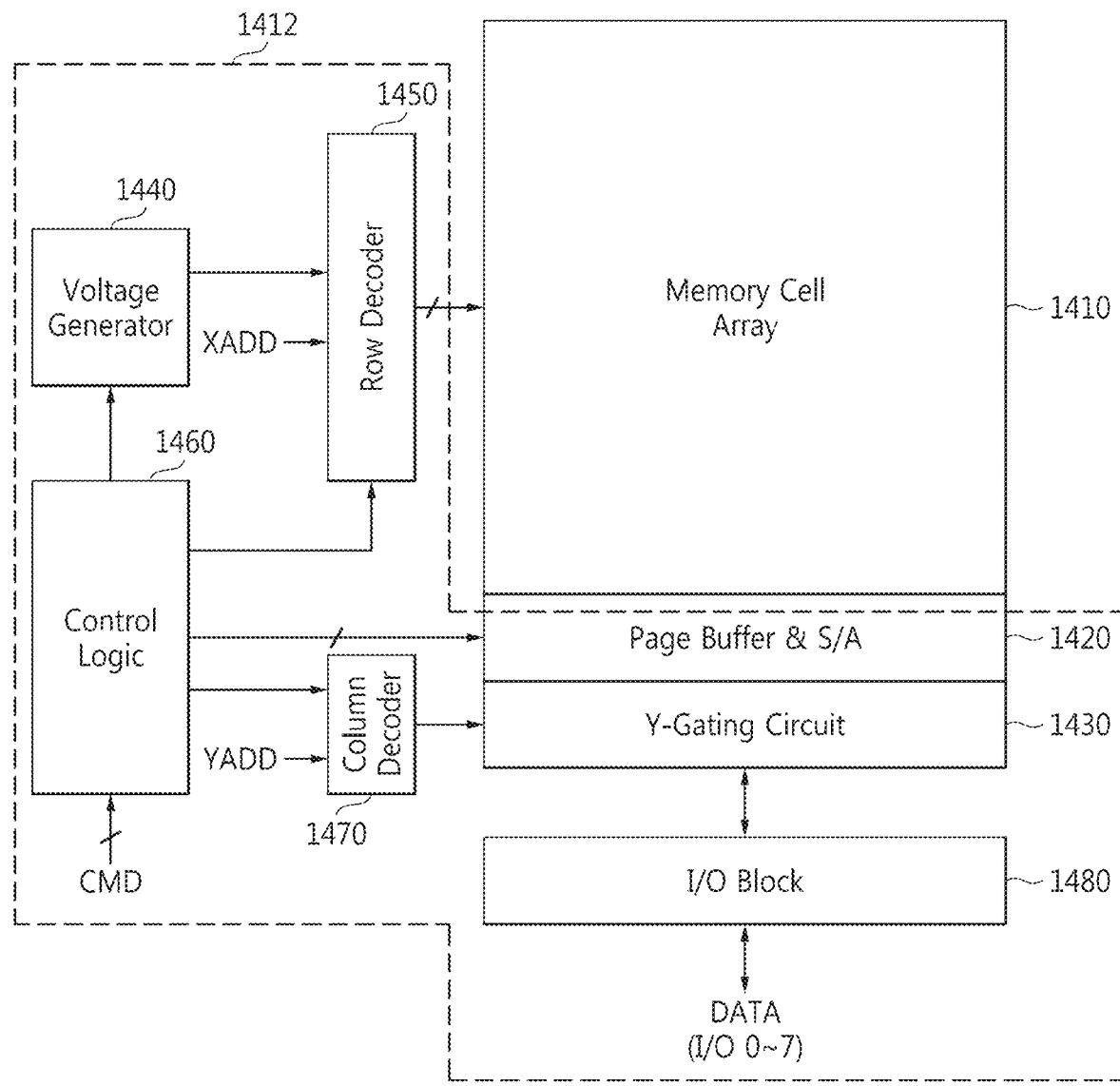
FIG. 2 is a detailed diagram of a nonvolatile main memory device according to an example embodiment of the inventive concepts.
Figure 3:
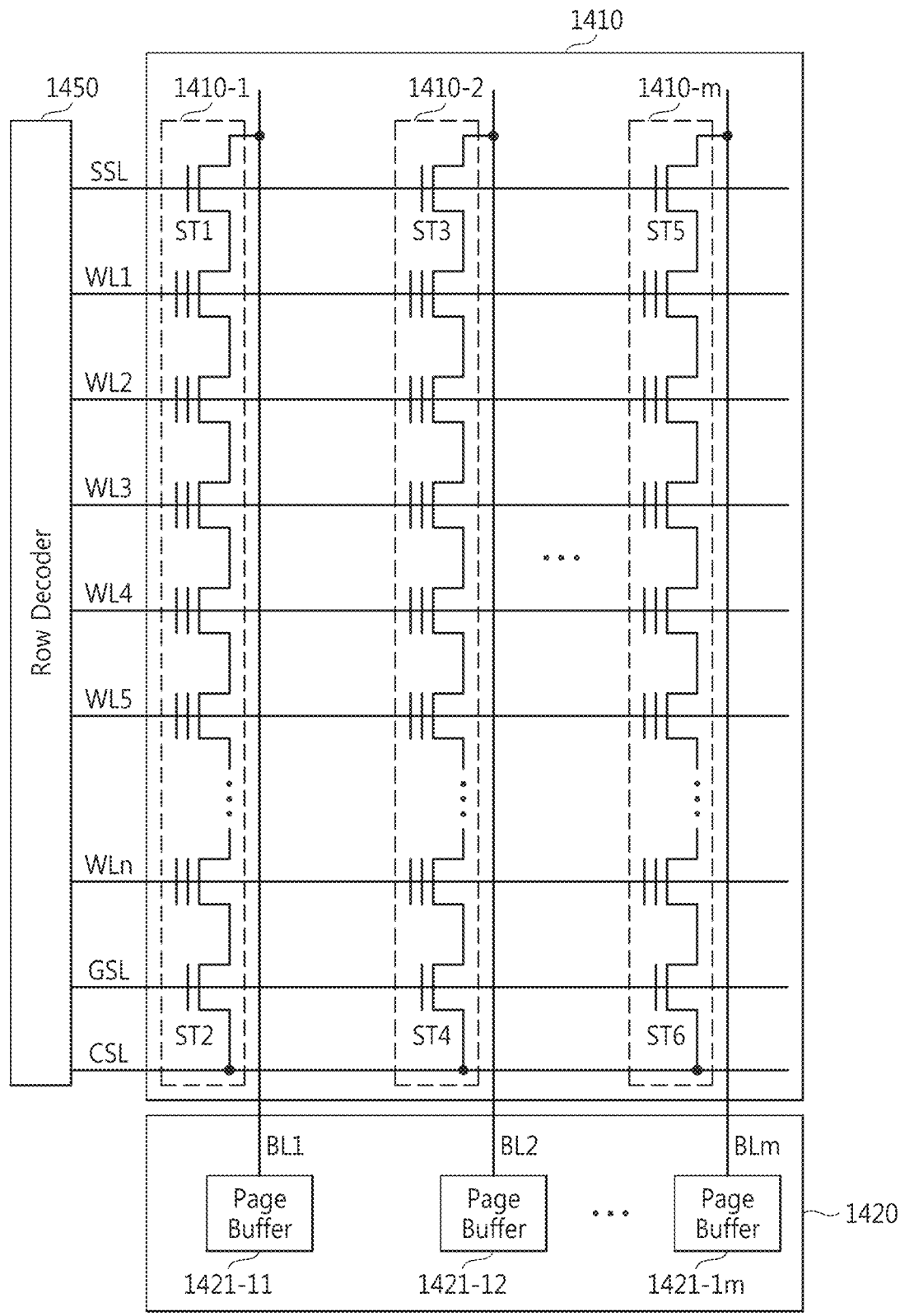
FIG. 3 is a detailed diagram of a memory cell array illustrated in FIG. 2 according to an example embodiment of the inventive concepts.
Figure 4:
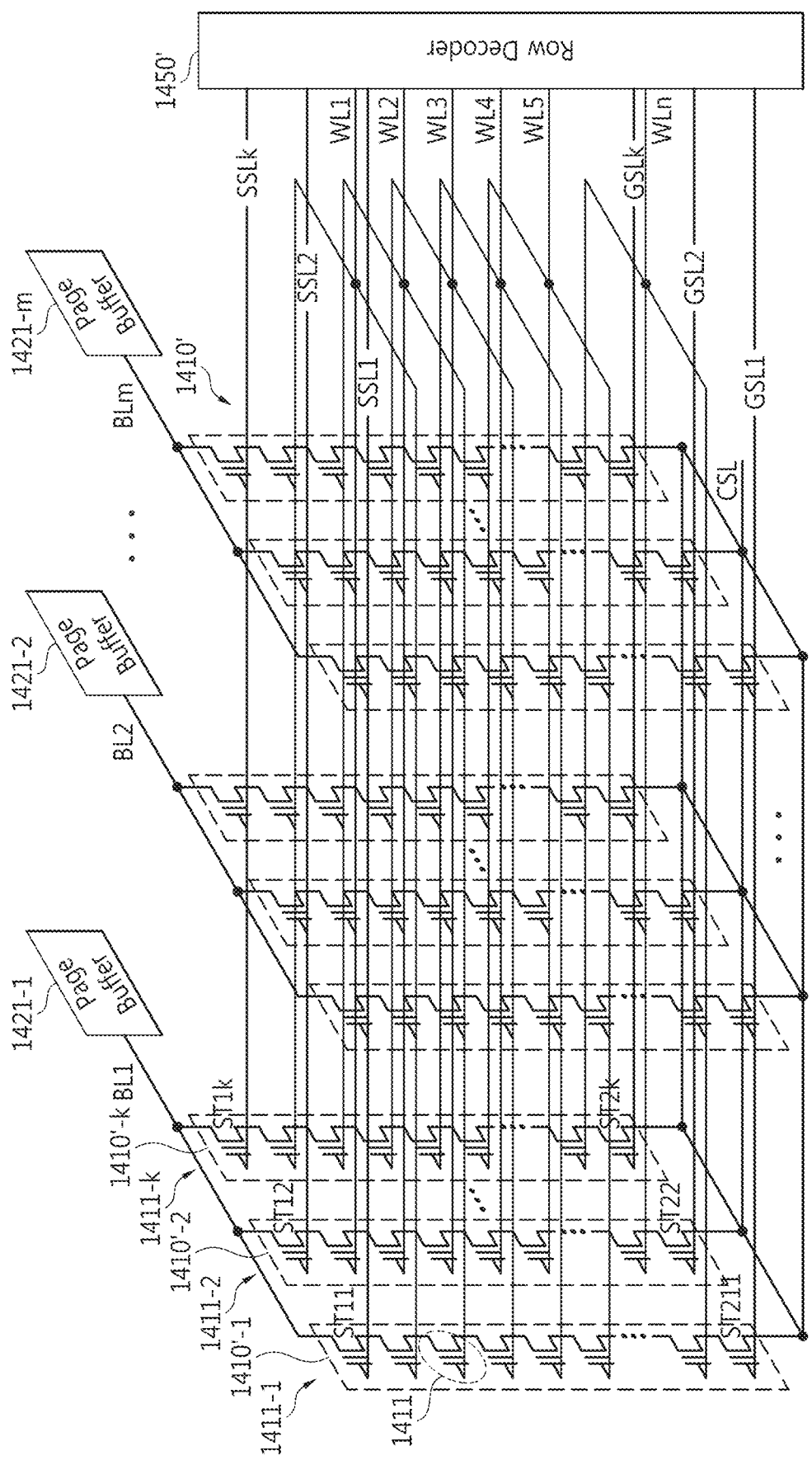
FIG. 4 is a detailed diagram of the memory cell array illustrated in FIG. 2 according to an example embodiment of the inventive concepts.

FIG. 2 is a block diagram of a nonvolatile main memory 140-1 formed of NAND flash memory according to an example embodiment of the inventive concepts. FIG. 3 is a detailed diagram of a memory cell array 1410 illustrated in FIG. 2 according to an example embodiment of the inventive concepts. FIG. 4 is a detailed diagram of the memory cell array 1410 illustrated in FIG. 2 according to an example embodiment of the inventive concepts.

Referring to FIG. 2, the nonvolatile main memory 140-1 may include the memory cell array 1410 and an access circuit 1412. The memory cell array 1410 includes NAND memory cell strings respectively connected to bit lines. Each of the NAND memory cell strings includes a plurality of nonvolatile memory cells connected in series to one another.

Each NAND memory cell string may be laid out (or embodied) on one plane (or layer) in two dimensions as illustrated in FIG. 3. Alternatively, the memory cell array 1410 may be implemented in three dimensions, as illustrated in FIG. 4, using a wafer stack, a chip stack, or a cell stack.

Referring to FIGS. 3 and 4, the NAND memory cell string may include the nonvolatile memory cells connected in series between a string selection transistor ST1 connected to one of the bit lines and a ground selection transistor ST2 connected to a common source line (CSL). A gate of the string selection transistor ST1 may be connected to a string selection line (SSL). Gates of the respective nonvolatile memory cells may be connected to a plurality of word lines, respectively. A gate of the ground selection transistor ST2 may be connected to a ground selection line (GSL). The NAND memory cell strings may be connected to page buffers 1421-11 through 1421-1m in FIG. 3 or 1421-1 through 1421-m in FIG. 4, respectively. At this time, the number of word lines may vary depending on example embodiments.

The three-dimensional (3D) memory cell array may be monolithically formed at one or more physical levels in an array of memory cells having an active region disposed on or above a silicon substrate and may include a circuit related with the operation of the memory cells. The circuit may be formed in, on or above the silicon substrate. The term "monolithic" means that layers at each level in an array are directly deposited on layers at an underlying level in the array. The three-dimensional memory cell array may include a vertical NAND string which is vertically oriented so that at least one memory cell is placed on or above another memory cell. The at least one memory cell may include a charge trap layer. The following patent documents, which are hereby incorporated by reference, describe suitable 3D memory cell array configurations, in which the 3D memory cell array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

The access circuit 1412 may access the memory cell array 1410 to perform a data access operation, for example, a program operation, a read operation, or an erase operation, according to a command (or a set of commands) and an address received from an outside, for example, the CPU 120. The access circuit 1412 may include a voltage generator 1440, a row decoder 1450, a control logic 1460, a column decoder 1470, a page buffer and sense amplifier (S/A) block 1420, a Y-gating circuit 1430, and an I/O block 1480.

The voltage generator 1440 may generate a voltage for a data access operation in response to a control code generated by the control logic 1460. The voltage generator 1440 may generate a program voltage and a program-verify voltage to perform a program operation, read voltages to perform a read operation, and an erase voltage and an erase-verify voltage to perform an erase operation and may output the voltages for each of the operations to the row decoder 1450.

The control logic 1460 may control the overall operation of the access circuit 1412 in response to a command CMD output from the CPU 120. The control logic 1460 may control memory read state information to be sensed during a memory read operation and control data that has been read to be output to the CPU 120.

Under the control of the control logic 1460, the column decoder 1470 may decode a column address YADD and output a plurality of select signals to the Y-gating circuit 1430.

The page buffer and S/A block 1420 may include a plurality of page buffers PB. The page buffers PB may be connected to the bit lines, respectively.

The page buffers PB may operate as drivers that temporarily store data read from the memory cell array 1410 in the read operation according to the control of the control logic 1460. Each of the page buffers PB may also operate as an S/A which senses and amplifies a voltage of each bit line during the read operation according to the control of the control logic 1460.

The Y-gating circuit 1430 may control transmission of data between the page buffer and S/A block 1420 and the I/O block 1480 in response to the select signals received from the column decoder 1470. The I/O block 1480 may transmit data from an outside to the Y-gating circuit 1430 or transmit data from the Y-gating circuit 1430 to the CPU 120 through a plurality of I/O pins (or a data bus).

Figure 5:
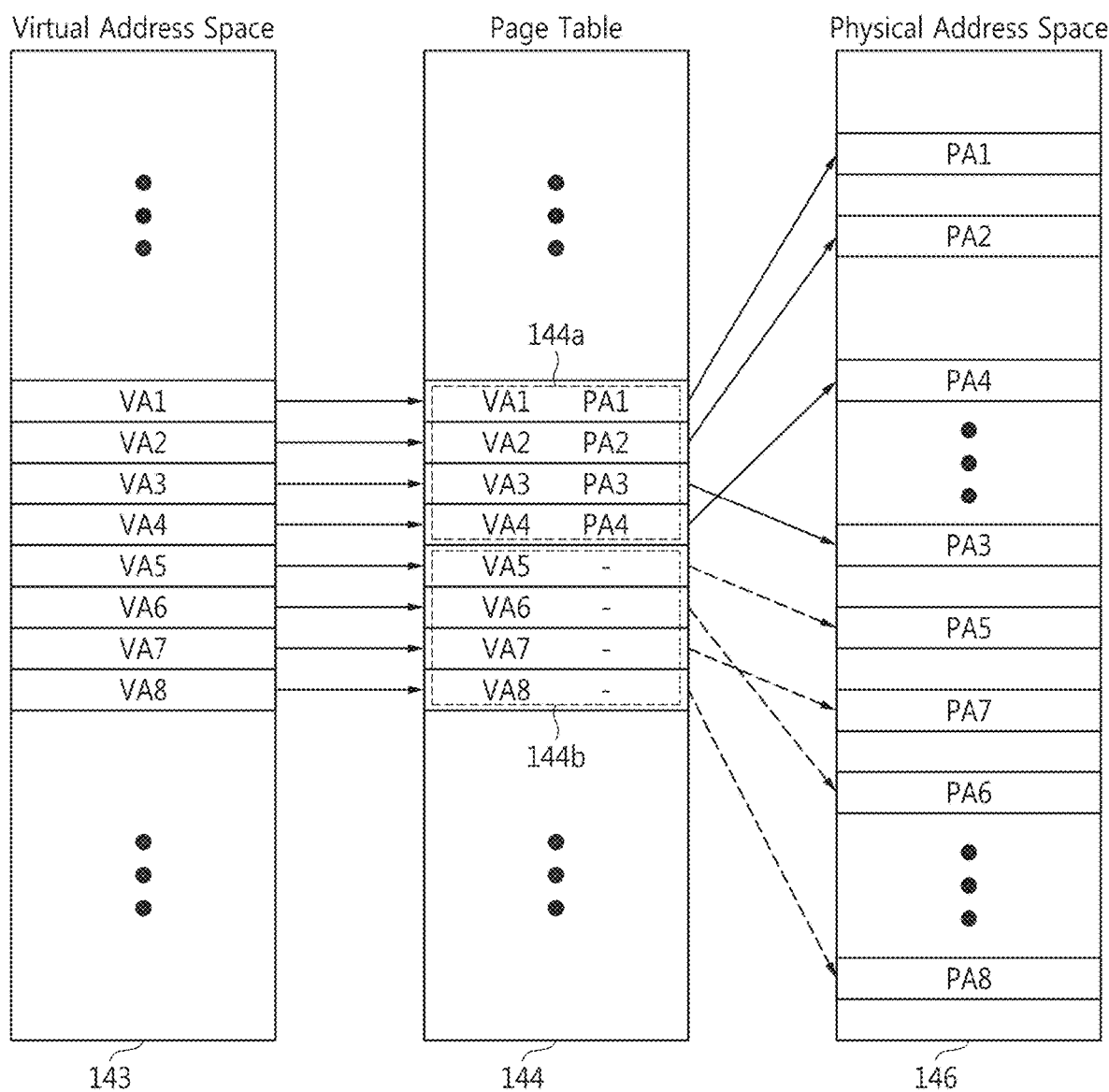
FIG. 5 is a diagram for explaining a page fault which may occur during memory mapping between pages in virtual memory and frames in physical memory.

FIG. 5 is a diagram for explaining a page fault which may occur during memory mapping between pages in virtual memory and frames in physical memory. Referring to FIG. 5, memory mapping may be performed between virtual addresses indicating pages in virtual memory and physical addresses indicating frames in physical memory. The virtual addresses may be managed in a virtual address space 143 and the physical addresses may be managed in a physical address space 146.

For instance, virtual addresses VA1, VA2, VA3, and VA4 existing in the virtual address space 143 may be memory-mapped to physical addresses PA1, PA2, PA3, and PA4, respectively. The result of the memory mapping may be stored in the PT 144. The PT 144 may generate and manage a page table entry which includes a virtual address (e.g., VA1) and a corresponding physical address (e.g., PA1).

FIG. 5 shows an example 144a in which a page table entry is generated as a result of memory mapping and an example 144b in which a page table entry is not generated as a result of memory mapping. The process of memory mapping may be referred to as paging. A page fault may occur when a page which a currently executed program intends to consult does not exist in the PT 144. For instance, when page table entries including virtual addresses VA5, VA6, VA7, and VA8 and corresponding physical addresses PA5, PA6, and PA8 do not exist in the PT 144 (144b), a page fault may occur.

The page fault may be divided into a major fault and a minor fault. The major fault may be a page fault which occurs when a portion or portions of a current program is not loaded from sub memory to main memory. The minor fault may be a page fault which occurs when an entirety of a current program has already been loaded from sub memory to main memory.

The minor fault may involve latency which occurs during update of the PT 144, for example, user/kernel mode switching for input of a page, which is desired for the execution of a program, to the PT 144. The major fault may involve latency which occurs while a currently executed program is being loaded from sub memory to main memory as well as latency occurring due to the minor fault.

According to some example embodiments of the inventive concepts, when a program stored in the sub memory 182 is executed, the nonvolatile main memory system 10 may load the entirety of the program to the nonvolatile main memory 140, as described above. Accordingly, when a page fault occurs because a page for the program does not exist in the PT 144, the page fault may include only minor fault. Hereinafter, a currently executed program is referred to as a "process".

Figure 6:
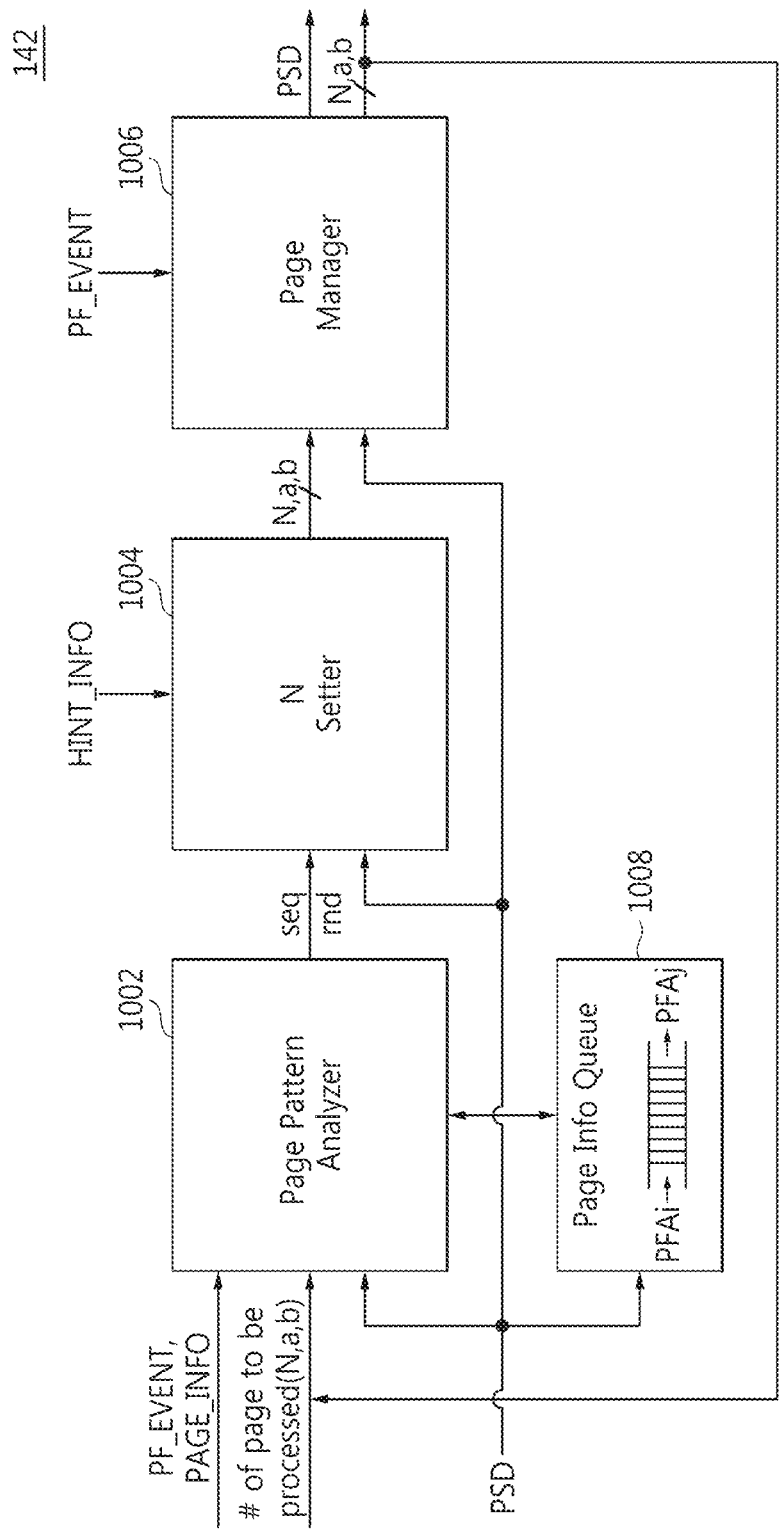
FIG. 6 is a block diagram of a combination of hardware and software components included in a page fault processor (PFP) illustrated in FIG. 1.

FIG. 6 is a block diagram of a combination of hardware and software components included in the page fault processor (PFP) 142 illustrated in FIG. 1. Referring to FIGS. 1 through 6, the PFP 142 may include a page pattern analyzer 1002, an N setter 1004, a page manager 1006, and a page information queue 1008 as the combination of hardware and software components. The combination of hardware and software components 1002, 1004, 1006, and 1008 may control the elements of a nonvolatile main memory system 10 overall together with the OS.

The page pattern analyzer 1002 may receive information PF_EVENT about occurrence non-occurrence of a page fault, page information PAGE_INFO corresponding to the page fault, and information (N, a, b) about the number of pages to be processed in the page manager 1006, where N, "a", and "b" are integers of at least 1. The page pattern analyzer 1002 may determine whether the pattern of pages having a page fault is sequential or random using information which has been received and may output a determination result (seq, rnd) to the N setter 1004. The page pattern analyzer 1002 may use data (e.g., PFAi through PFAj) stored in the page information queue 1008 to determine the pattern of pages having a page fault.

The N setter 1004 may receive the determination result (seq, rnd) from the page pattern analyzer 1002. The N setter 1004 may also externally receive hint information HINT_INFO. The hint information HINT_INFO may be information which is transmitted from the CPU 120 at the request of a user of the nonvolatile main memory system 10. The N setter 1004 may set the number of pages, which the page manager 1006 processes consecutively, using the determination result (seq, rnd) and/or the hint information HINT_INFO. The N setter 1004 may send the information (N, a, b) about the number of pages that has been set to the page manager 1006.

The page manager 1006 may function as a page fault handler which is called by the OS when a page fault occurs. The page manager 1006 may consecutively process pages using the information PF_EVENT about occurrence/non-occurrence of a page fault and the information (N, a, b) about the number of pages that has been set. Here, "consecutively processing pages" may mean consecutively performing memory mapping between pages in virtual memory and frames in physical memory and storing the result of the memory mapping in the PT 144.

Meanwhile, the page pattern analyzer 1002, the N setter 1004, the page manager 1006, and the page information queue 1008 may receive a signal PSD indicating the end of a process. When receiving the signal PSI), the combination of hardware and software components 1002, 1004, 1006, and 1008 of the PFP 142 may be initialized. The operations and functions of the PFP 142 and the page pattern analyzer 1002, the N setter 1004, page manager 1006, and the page information queue 1008 included in the PFP 142 will be described in detail with reference to FIGS. 7 through 14 later.

The page pattern analyzer 1002, the N setter 1004, the page manager 1006, and the page information queue 1008 may be implemented as hardware components in other example embodiments. At this time, the page pattern analyzer 1002, the N setter 1004, the page manager 1006, and the page information queue 1008 may be implemented inside the computing system 100.

In detail, each of the components 1002, 1004, 1006, and 1008 may be implemented as a part of the CPU 120 or may be implemented in a chip separated from the CPU 120. When each of the components 1002, 1004, 1006, and 1008 is implemented in a chip separated from the CPU 120, it may be implemented inside a memory management unit (MMU) (not shown). At this time, the components 1002, 1004, 1006, and 1008 may receive the information PF_EVENT about occurrence non-occurrence of a page fault, the hint information HINT_INFO, or the signal PSD indicating the end of a process from the CPU 120 through the bus 160.

Figure 7:
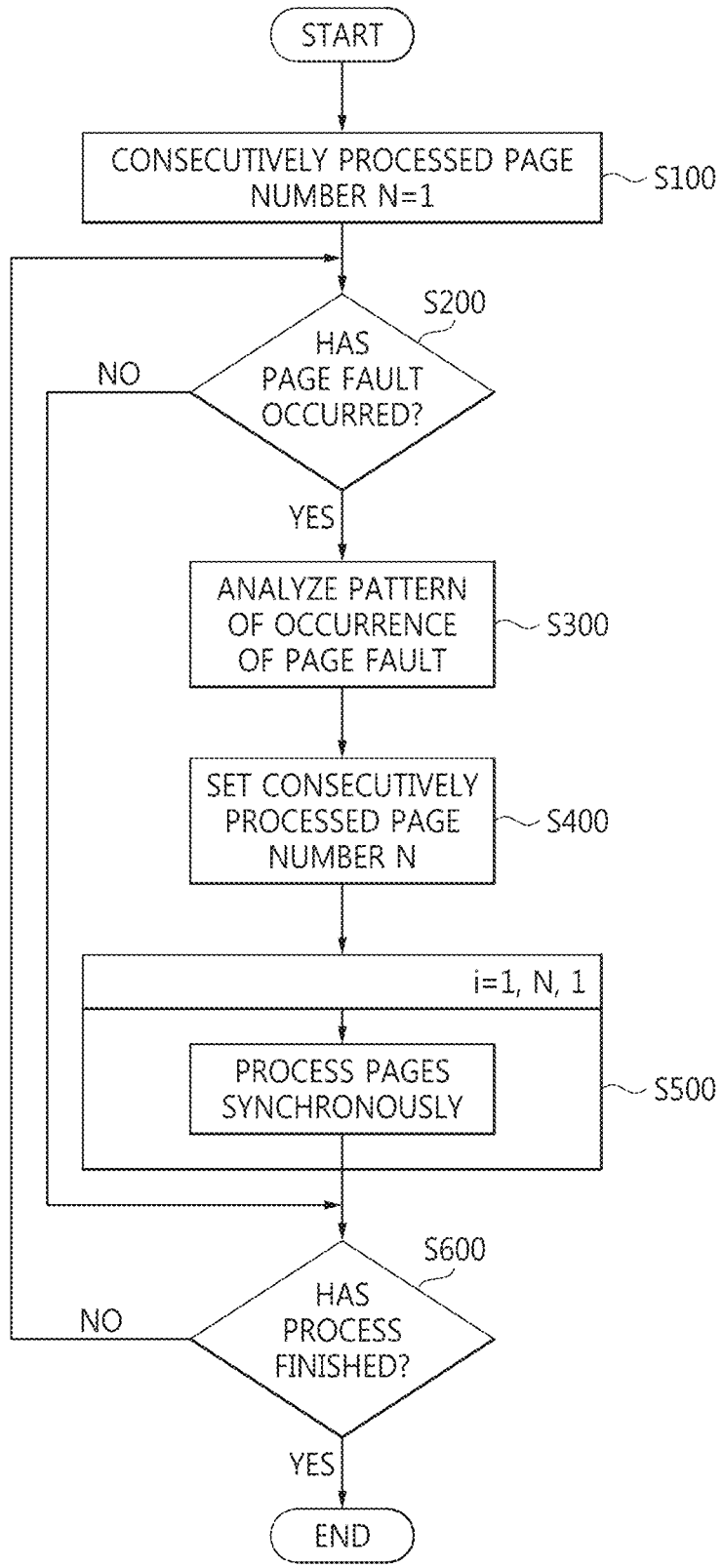
FIG. 7 is a flowchart of a method of handling a page fault in a nonvolatile main memory system according to an example embodiment of the inventive concepts.
Figure 8:
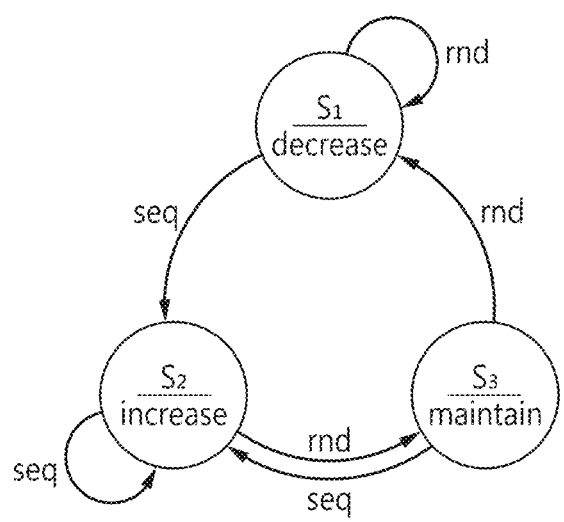
FIG. 8 is a status diagram used to set the number of pages which will be consecutively processed when a page fault occurs.

FIG. 7 is a flowchart of a method of handling a page fault in the nonvolatile main memory system 10 according to some example embodiments of the inventive concepts. FIG. 8 is a status diagram used to set the number of pages which will be consecutively processed when a page fault occurs.

Referring to FIGS. 1 through 7, the number N of consecutively processed pages may be set to 1 in operation S100. The setting of the page number N may be performed by the CPU 120. Thereafter, whether a page fault has occurred may be determined in operation S200. The determination may be performed by the CPU 120.

When a page fault has occurred, the CPU 120 may generate and send the information PF_EVENT about occurrence/non-occurrence of the page fault and the page information PAGE_INFO corresponding to the page fault to the page pattern analyzer 1002. The CPU 120 may also switch the execution mode of a process from a user mode to a kernel mode.

When it is determined that a page fault has occurred (i.e., in case of YES) in operation S200, the pattern of the occurrence of the page fault may be analyzed in operation S300. The analysis of the occurrence pattern may be performed by the page pattern analyzer 1002. The analysis of the occurrence pattern may be carried out by determining whether the occurrence of a page fault is sequential. Here, that the occurrence of a page fault is sequential may mean that a difference between an address of a page that has been processed last time and an address of a page requested by the process has a predetermined (or alternatively, desired) value. The difference between the addresses may be 2 to the power of an integer (e.g., $2^{12}$=4096 bytes or 4 KB).

Thereafter, the number of pages to be consecutively processed (hereinafter, referred to as "consecutively processed page number N") may be set in operation S400. The consecutively processed page number N may be set by the N setter 1004. The page number N may be set by determining a plurality of predefined data states.

FIG. 8 shows a plurality of data states $S_1$, $S_2$, and $S_3$. An input for each of the data states $S_1$, $S_2$, and $S_3$ may be a value based on the analysis result obtained in operation S300. For example, when it is determined that the page fault has occurred sequentially, an input for each of the data states $S_1$, $S_2$, and $S_3$ may be 1. When it is determined that the page fault has occurred randomly, an input for each of the data states $S_1$, $S_2$, and $S_3$ may be 0. An initial data state may be the first data state $S_1$.

When "1" is input in the first data state $S_1$ which is the initial data state, the data state may shift to the second data state $S_2$. When "1" is input in the second data state $S_2$, the second data state $S_2$ is maintained. When "0" is input in the second data state $S_2$, the data state may shift to the third data state $S_3$. When "1" is input in the third data state $S_3$, the data state may shift to the second data state $S_2$. When "0" is input in the third data state $S_3$, the data state may shift to the first data state $S_1$.

The consecutively processed page number N may be set according to a current data state. For instance, when the current data state is the first data state $S_1$, the page number N may be decreased. When the current data state is the second data state $S_2$, the page number N may be increased. When the current data state is the third data state $S_3$, the page number N may be maintained.

After operation S400, as many pages as the page number N may be consecutively processed in operation S500. The processing the pages consecutively may be performed by the page manager 1006. Operation S500 will be described in detail with reference to FIGS. 9A and 9B.

Figures 9A, 9B:
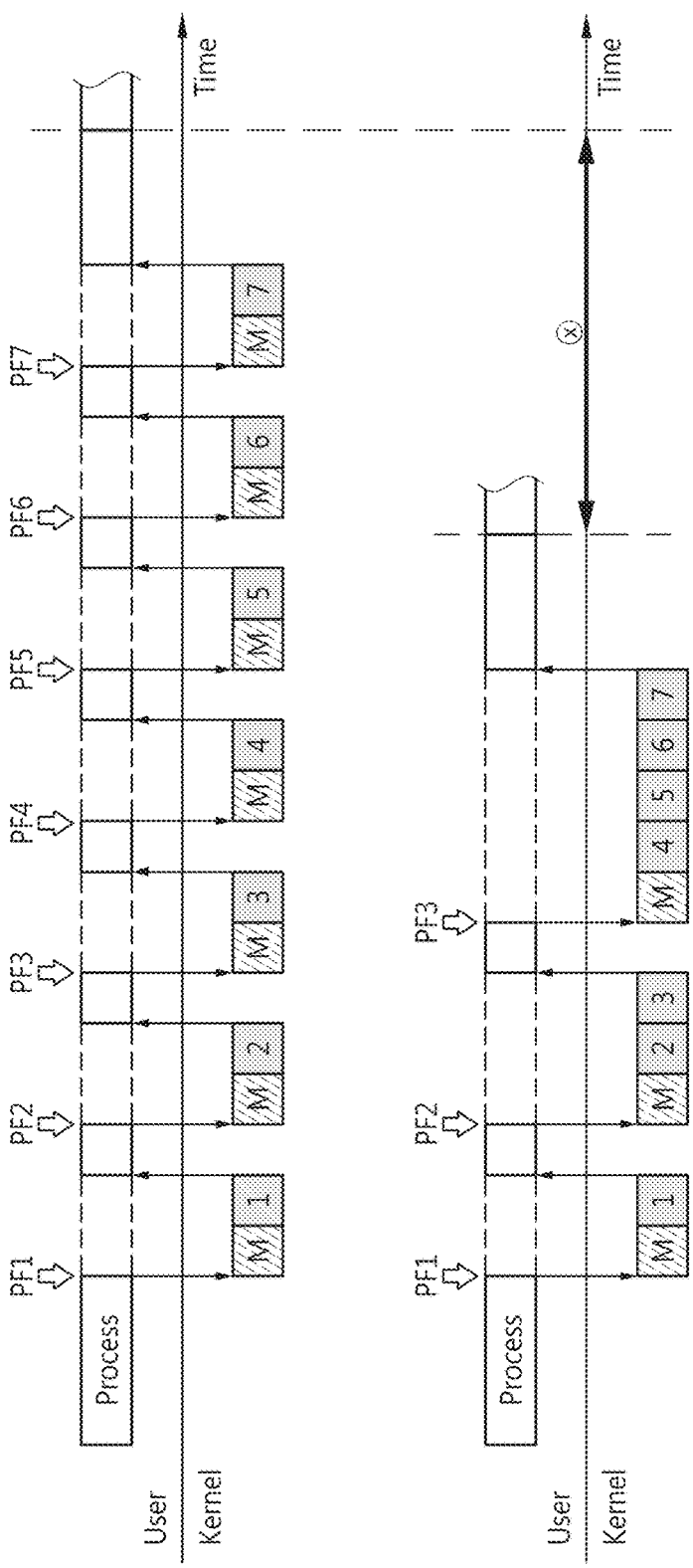
FIG. 9A is a diagram of a method of handling a page fault in a comparison example.
FIG. 9B is a diagram of a method of handling a page fault according to an example embodiments of the inventive concepts.

FIG. 9A is a diagram of a method of handling a page fault in a comparison example. FIG. 9B is a diagram of a method of handling a page fault according to an example embodiment of the inventive concepts. Referring to FIGS. 9A and 9B, when page faults PF1 through PF7 occur during the process, the execution mode of the process may be switched from the user mode to the kernel mode. The page faults PF1 through PF7 may be minor faults and the mode switching may bring latency M. Referring to FIGS. 9A and 9B, a total of seven pages are sequentially processed after the first page fault PF1 occurs during the process.

Referring to FIG. 9A, when a page fault occurs during the process in the comparison example, only a page having the page fault is processed. Accordingly, when seven sequential pages are desired to be processed, a total of seven page faults (e.g., PF1 through PF7) are generated.

Referring to FIG. 9B, however, when a page fault occurs during the process in an example embodiment of the inventive concepts, a page having the page fault and sequential pages may be consecutively processed according to the page number N set in operation S400. When a difference between an address of a page that has been processed in response to the page fault and an address of a page to be processed in response to the page fault PF2 is equal to a predetermined value, the page number N may be doubled when the page fault PF2 occurs. In the same manner, when a difference between the address of the page that has been processed in response to the page fault PF2 and an address of a page to be processed in response to the page fault PF3 is equal to the predetermined value, the page number N may be doubled when the page fault PF3 occurs. At this time, the pages may be synchronously processed in the kernel mode without giving up control.

In the comparison example illustrated in FIG. 9A, a total of seven page faults PF1 through PF7 are generated while seven sequential pages are being processed. However, in the example embodiment of the inventive concepts illustrated in FIG. 9B, only three page faults PF1 through PF3 are generated while seven sequential pages are being processed. Accordingly, the method according to the current example embodiment of the inventive concepts reduces the number of page faults when processing sequential pages, thereby cutting down (as shown in (x)) cost for user-kernel mode switching.

Referring back to FIG. 7, after as many pages as the page number N are consecutively processed in operation S500 or when it is determined that no page fault has occurred (i.e., in case of NO) in operation S200, whether the process has finished is determined in operation S600. When the process finishes, pages requested by the process may be erased from the PT 144. When it is determined that the process has finished (i.e., in case of YES) in operation S600, the method may end. When it is determined that the process has not finished (i.e., in case of NO) in operation S600, the method may return to operation S200.

Figure 10:
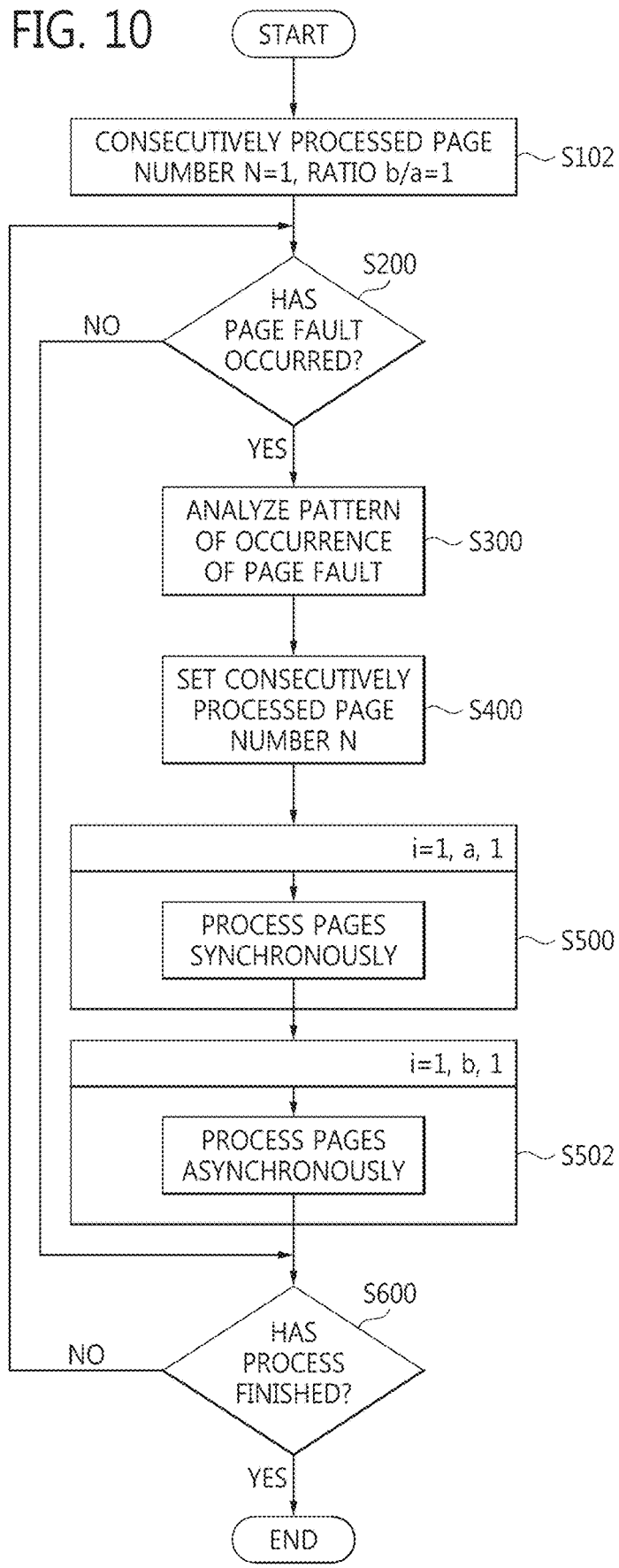
FIG. 10 is a flowchart of a method of handling a page fault in a nonvolatile main memory system according to an example embodiment of the inventive concepts.

FIG. 10 is a flowchart of a method of handling a page fault in the nonvolatile main memory system 10 according to an example embodiment of the inventive concepts. Like numbers refer to like operations in FIGS. 7 and 10. Detailed descriptions of like operations will be omitted and differences between the method illustrated in FIG. 7 and the method illustrated in FIG. 10 will be mainly described.

Referring to FIGS. 1 through 6 and FIG. 10, the consecutively processed page number N may be set to 1 and a ratio b/a of asynchronously processed pages to synchronously processed pages may be set to 1 in operation S102. When it is determined that the page fault has occurred (i.e., in case of YES) in operation S200, the pattern of the occurrence of the page fault may be analyzed in operation S300. The consecutively processed page number N may be set according to the analysis result in operation S400.

Thereafter, as many pages as the page number N may be consecutively processed in operations S500 and S502. The consecutive page processing may be performed by the page manager 1006. Operations S500 and S502 will be described in detail with reference to FIGS. 11A and 11B.

FIG. 11A is a diagram of a method of handling a page fault according to an example embodiment of the inventive concepts. FIG. 11B is a diagram of a method of handling a page fault according to an example embodiment of the inventive concepts. Here, the consecutively processed page number N is set to 8 and the number "a" of synchronously processed pages and the number "b" of asynchronously processed pages are set to 4 as an example.

Referring to FIG. 11B, when pages as many as the page number N are consecutively processed, some pages "a" may be synchronously processed and the remaining pages "b" may be asynchronously processed. In other words, after the some pages "a" are processed in the kernel mode, the remaining pages "b" may be processed in the user mode. Because some of sequential pages to be consecutively processed are synchronously processed while the remaining pages are asynchronously processed, the process is able to handle commands as soon as taking over the control. Thus, command handling time of the process can be cut down (as shown in (y)).

Figure 12:
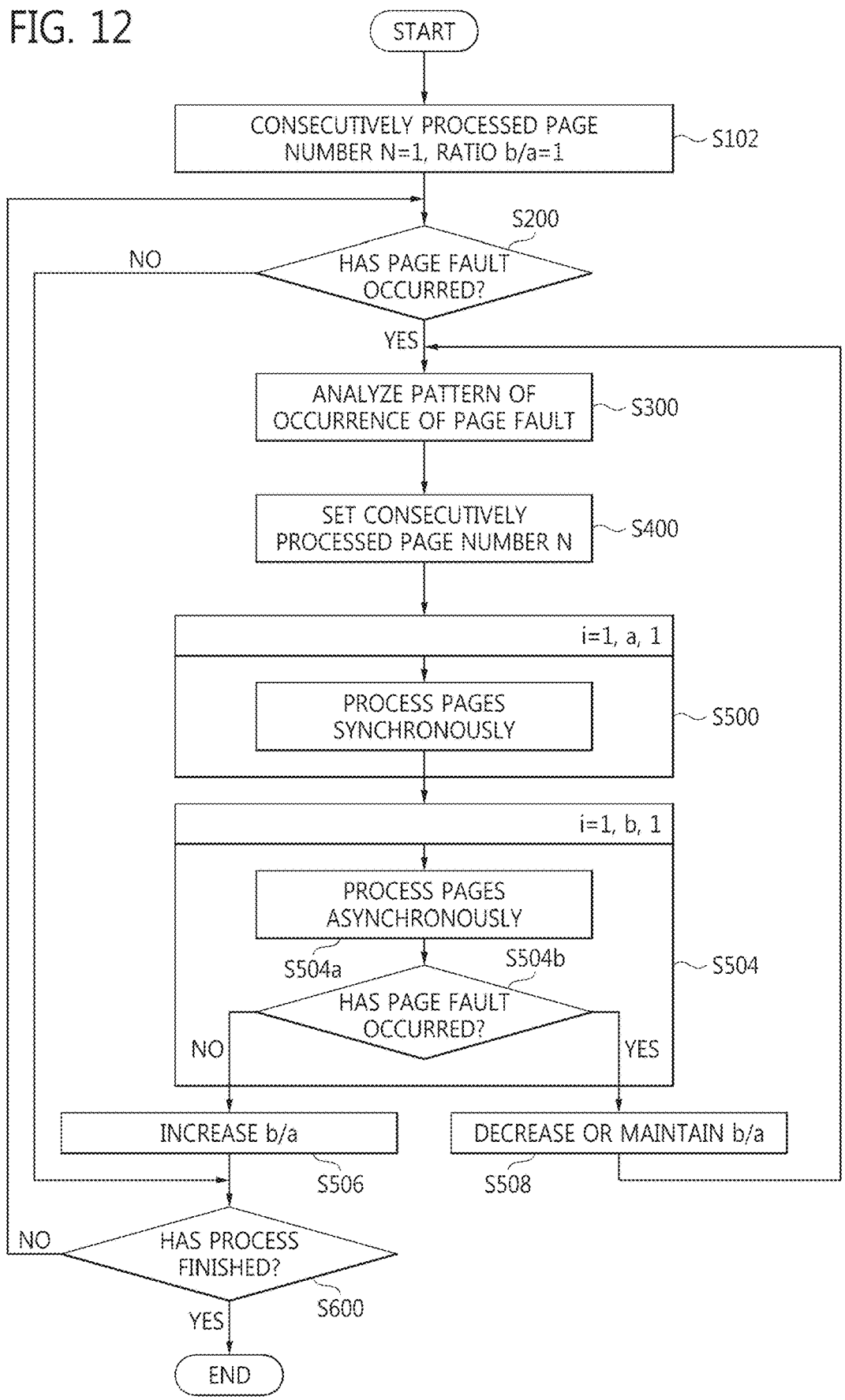
FIG. 12 is a flowchart of a method of handling a page fault in a nonvolatile main memory system according to an example embodiment of the inventive concepts.
Figure 13:
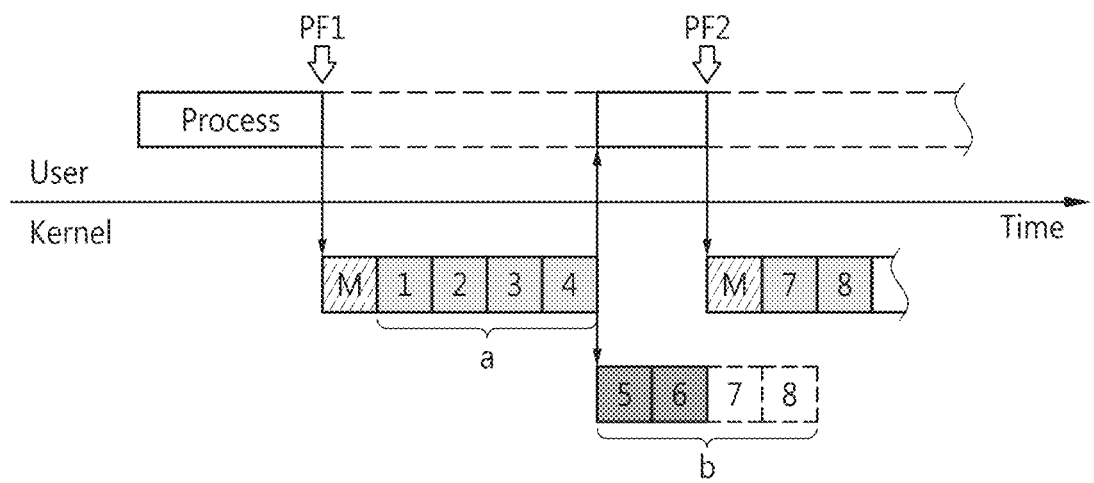
FIG. 13 is a diagram of a method of handling a page fault according to an example embodiment of the inventive concepts.

FIG. 12 is a flowchart of a method of handling a page fault in the nonvolatile main memory system 10 according to an example embodiment of the inventive concepts. Like numbers refer to like operations in FIGS. 10 and 12. Detailed descriptions of like operations will be omitted and differences between the method illustrated in FIG. 10 and the method illustrated in FIG. 12 will be mainly described. FIG. 13 is a diagram of a method of handling a page fault according to an example embodiment of the inventive concepts.

Referring to FIGS. 1 through 6 and FIG. 12, when pages as many as the page number N are consecutively processed, some pages "a" may be synchronously processed in operation S500 and the remaining pages "b" may be asynchronously processed in operation S504. Further, every time one of the pages "b" is processed in operation S504a, whether a page fault has occurred may be determined in operation S504b. Operations S504a and S504b will be described in detail with reference to FIG. 13.

Referring to FIG. 13, the consecutively processed page number N is set to 8 and the number "a" of synchronously processed pages and the number "b" of asynchronously processed pages are set to 4. When the page fault PF1 occurs, the page manager 1006 may process the pages "a" synchronously and then process the pages "b" asynchronously.

In processing the pages "b" asynchronously, the ratio "b/a" may be increased in operation S506 when the page fault PF2 does not occur (i.e., in case of NO) in operation S504b. When the page fault PF2 occurs (i.e., in case of YES) in operation S504b the ratio "b/a" may be decreased or maintained in operation S508. In some example embodiments, the ratio "b/a" may be maintained when the occurrence of the page fault PF2 is sequential and may be decreased when the occurrence of the page fault PF2 is random.

Referring back to FIG. 12, after operation S506, whether the process has finished may be determined in operation S600. After operation S508, the method may return to operation S300 to analyze the pattern of the occurrence of a page fault.

In the current example embodiment, when a page fault occurs while some of sequential pages which are consecutively processed are being processed, the ratio "b/a" of asynchronously processed pages to synchronously processed pages is increased, decreased, or maintained, so that page faults can be more efficiently handled.

Figure 14:
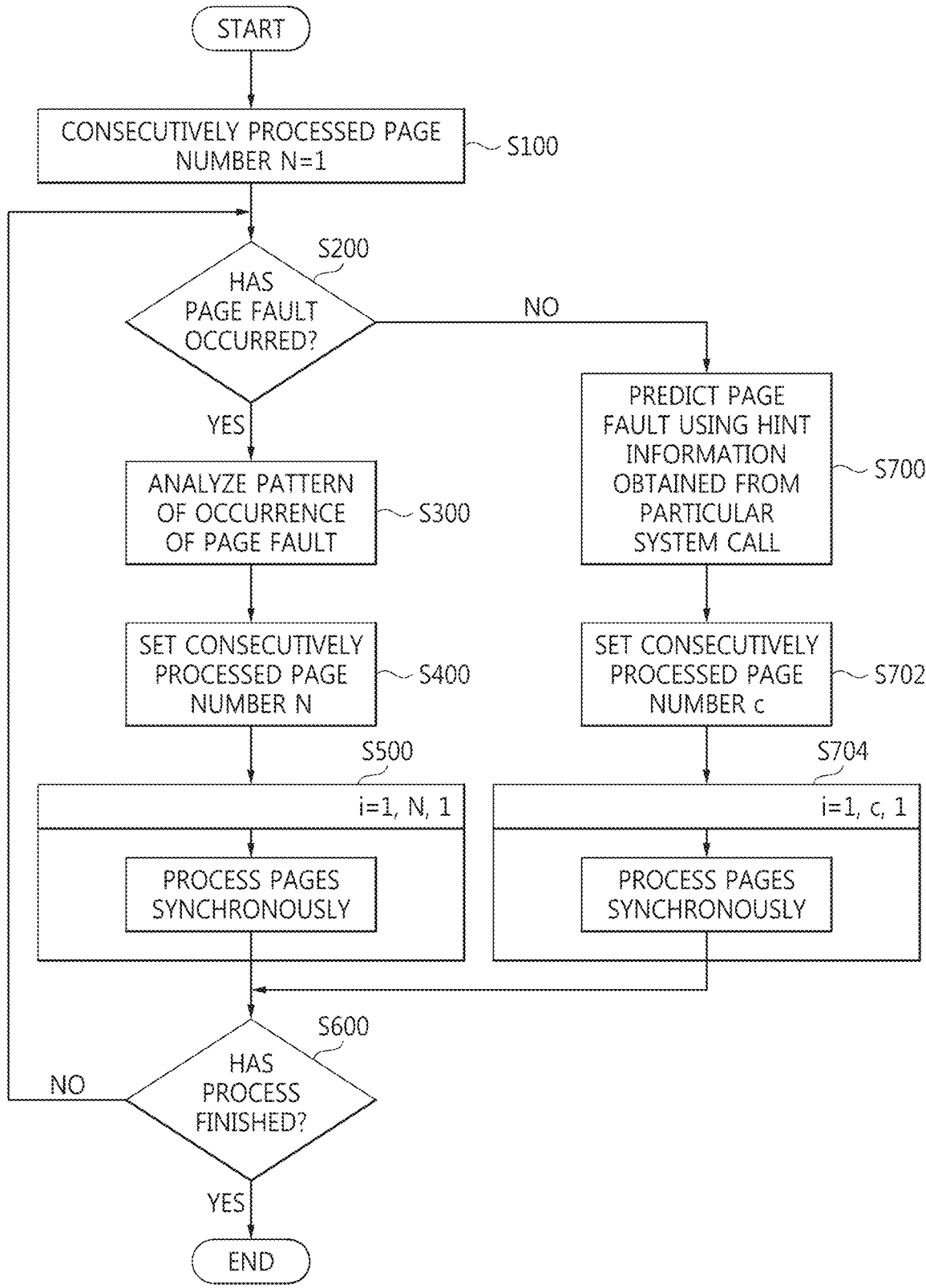
FIG. 14 is a flowchart of a method of handling a page fault in a nonvolatile main memory system according to an example embodiment of the inventive concepts.

FIG. 14 is a flowchart of a method of handling a page fault in the nonvolatile main memory system 10 according to an example embodiment of the inventive concepts. Like numbers refer to like operations in FIGS. 7 and 14. Detailed descriptions of like operations will be omitted and differences between the method illustrated in FIG. 7 and the method illustrated in FIG. 14 will be mainly described.

Referring to FIG. 14, when it is determined that the page fault has not occurred (i.e., in case of NO) in operation S200, occurrence of a page fault may be predicted using hint information obtained from a particular system call in operation S700. The hint information may be transmitted from the CPU 120 at the request of a user of the nonvolatile main memory system 10, as described above with reference to FIG. 6. For example, the hint information may be information in relation to a system call supported by the OS. The system call may be used to load data from sub memory to a page cache in advance in the nonvolatile main memory system.

After operation S700, the number "c" of consecutively processed pages may be set in operation S702 and pages are processed synchronously in operation S704. The hint information may also include information indicating whether addresses of pages corresponding to the data to be loaded to the page cache in advance are sequential or random. When the addresses of the pages are sequential, the number "c" of consecutively processed pages may be increased. When the addresses of the pages are random, the number "c" of consecutively processed pages may be decreased or maintained.

According to the current example embodiment, a page may be processed in advance using the hint information even when a page fault does not occur, and therefore, the occurrence of a page fault is predicted and reduced. A method of handling a page fault is not restricted to the example embodiment illustrated in FIG. 14.

Operations S200, S300, S400, and S500 illustrated in FIG. 14 may be replaced with operations S200, S300, S400, S500, and S502 illustrated in FIG. 10 or with operations S200, S300, S400, S500, S504, S504a S504i S506, and S508 illustrated in FIG. 12.

Figure 15:
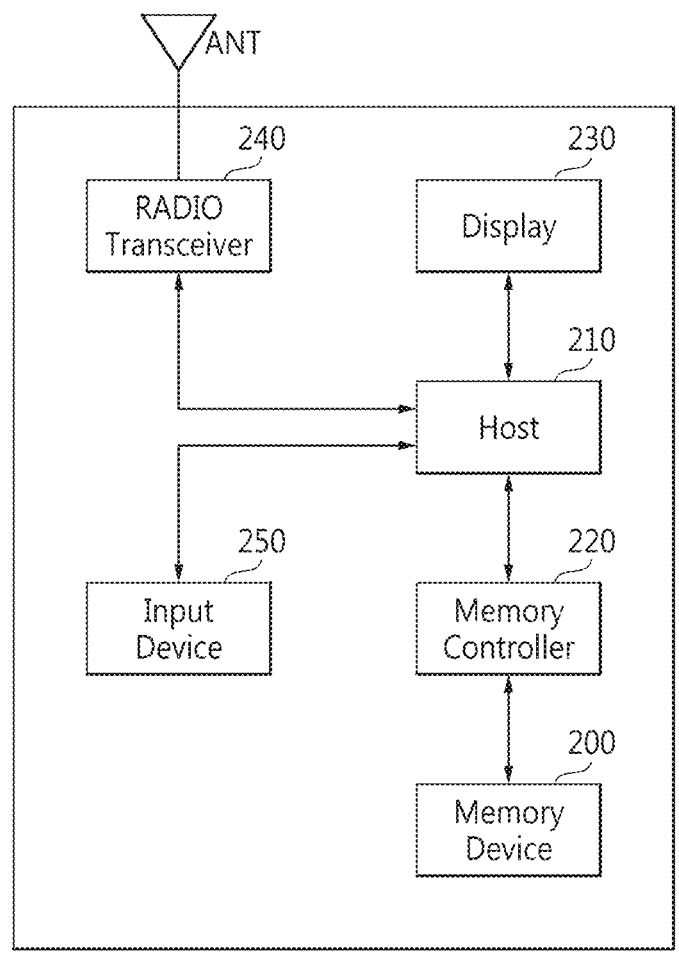
FIG. 15 is a block diagram of a system including the CPU and nonvolatile main memory illustrated in FIG. 1 according to an example embodiment of the inventive concepts.

FIG. 15 is a block diagram of a system 20 including the CPU 120 and the nonvolatile main memory 140 illustrated in FIG. 1 according to some an example embodiment of the inventive concepts. Referring to FIGS. 1 and 15, the system 20 may be implemented as an electronic device or a portable device. The portable device may be a cellular phone, a smart phone, or a tablet PC. The system 20 includes a host 210 and a memory device 200. The memory device 200 may be the nonvolatile main memory 140 illustrated in FIG. 1.

The host 210 and the memory device 200 may be packaged into a single package. At this time, the package may be mounted on a system board (not shown).

The system 20 may also include a memory controller 220 which controls, for example, a test operation and a data processing operation, e.g., a write operation or a read operation, of the memory device 200. The memory controller 220 may be controlled by the host 210 which controls the overall operation of the system 20. The memory controller 220 may be connected between the host 210 and the memory device 200. Data stored in the memory device 200 may be displayed on a display 230 according to the control of the host 210.

A radio transceiver 240 may transmit or receive radio signals through an antenna ANT. The radio transceiver 240 may convert radio signals received through the antenna ANT into signals that can be processed by the host 210. The host 210 may process the signals output from the radio transceiver 240 and store the processed signals in the memory device 200 or display the processed signals on the display 230. The radio transceiver 240 may also convert signals output from the host 210 into radio signals and output the radio signals to an external device through the antenna ANT.

An input device 250 allows control signals for controlling the operation of the host 210 or data to be processed by the host 210 to be input to the system 20. The input device 250 may be implemented as a pointing device such as a touch pad or a computer mouse, a keypad, or a keyboard.

The host 210 may control the display 230 to display data output from the memory device 200, radio signals output from the radio transceiver 240, or data output from the input device 250.

Figure 16:
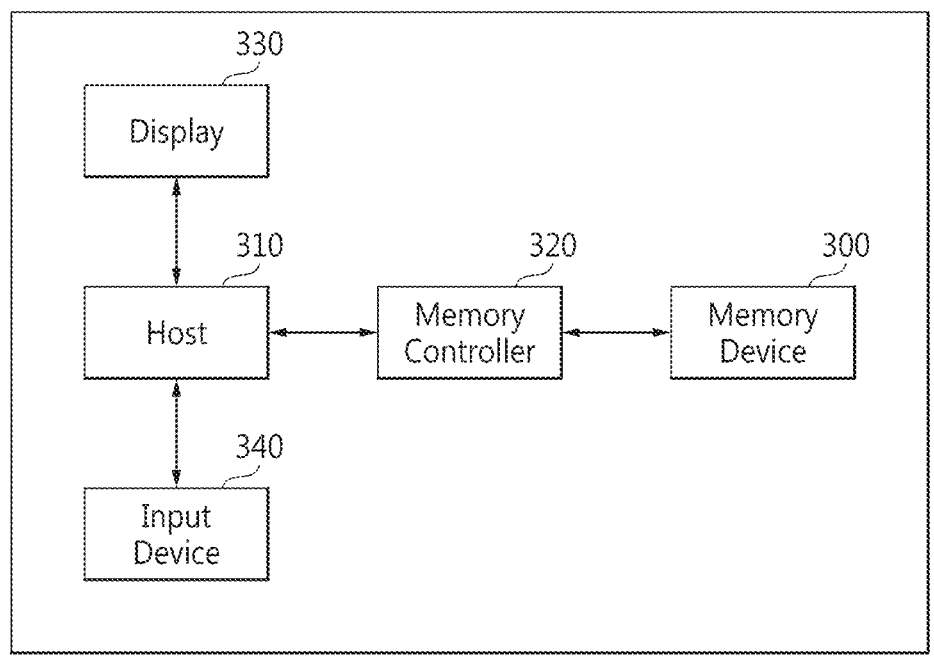
FIG. 16 is a block diagram of a system including the CPU and the nonvolatile main memory illustrated in FIG. 1 according to an example embodiment of the inventive concepts.

FIG. 16 is a block diagram of a system 30 including the CPU and the nonvolatile main memory illustrated in FIG. 1 according to an example embodiment of the inventive concepts. The system 30 may be implemented as a personal computer (PC), a tablet PC, a netbook, an e-reader, a personal digital assistant (PDA), a portable multimedia player (PMP), an MP3 player, or an MP4 player.

The system 30 includes a host 310 for controlling the overall operation of the system 30 and the memory device 300. The memory device 300 may be the memory device 140 illustrated in FIG. 1.

According to some example embodiments, the host 310 and the memory device 300 may be packaged into a single package. In this case, the package may be mounted on a system board (not shown).

The system 30 may include a memory controller 320 for controlling the operation of the memory device 300. The memory controller 320 may be the memory controller 180 illustrated in FIG. 1.

The host 310 may display data stored in the memory device 300 through the display 330 according to data input through the input device 340. The input device 340 may be implemented by a pointing device such as a touch pad or a computer mouse, a keypad, or a keyboard.

Figure 17:
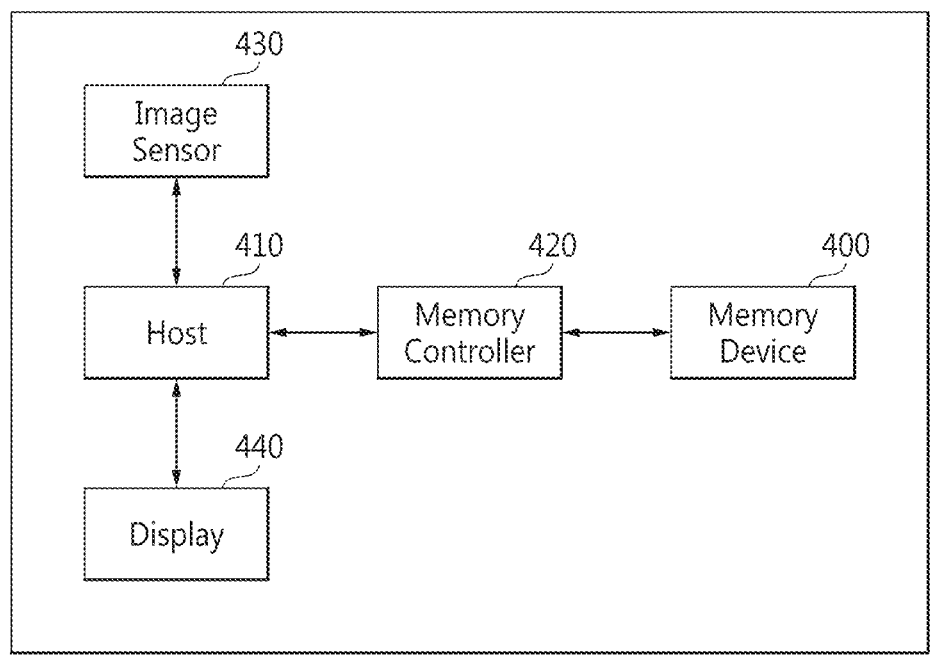
FIG. 17 is a block diagram of a system including the CPU and the nonvolatile main memory illustrated in FIG. 1 according to an example embodiment of the inventive concepts.

FIG. 17 is a block diagram of a system 40 including the CPU and the nonvolatile main memory illustrated in FIG. 1 according to an example embodiment of the inventive concepts. The system 40 may be implemented as an image processing device like a digital camera, a cellular phone equipped with a digital camera, or a smart phone equipped with a digital camera.

The system 40 includes a host 410, the memory device 400 and a memory controller 420 controlling the data processing operations, such as a write operation or a read operation, of the memory device 400. The system 40 further includes an image sensor 430 and a display 440.

The image sensor 430 included in the system 40 converts optical images into digital signals and outputs the digital signals to the host 410 or the memory controller 420. The digital signals may be controlled by the host 410 to be displayed through the display 440 or stored in the memory device 400 through the memory controller 420.

Data stored in the memory device 400 may be displayed through the display 440 according to the control of the host 410 or the memory controller 420. The memory controller 420, which may control the operations of the memory device 400, may be implemented as a part of the host 410 or as a separate chip.

Figure 18:
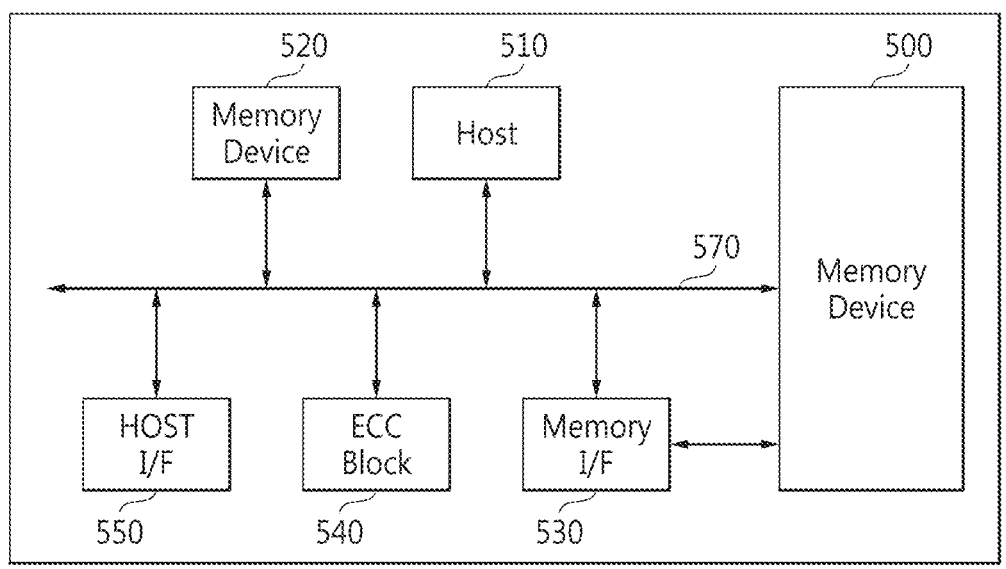
FIG. 18 is a block diagram of a system including the CPU and the nonvolatile main memory illustrated in FIG. 1 according to an example embodiment of the inventive concepts.

FIG. 18 is a block diagram of a system 50 including the CPU and the nonvolatile main memory illustrated in FIG. 1 according to an example embodiment of the inventive concept. The system 50 includes the memory device 520 and a host 510 controlling the operations of the memory device 520. The memory device 520 may be implemented by nonvolatile memory such as a flash memory.

The system 50 may include a system memory 500, a memory interface 530, an error correction code (ECC) block 540, and a host interface 550.

The system memory 500 may be used an operation memory of the host 510. The system memory 500 may be implemented by, for example, a non-volatile memory like read-only memory (ROM) or a volatile memory like static random access memory (SRAM).

The host 510 connected with the system 50 may perform data communication with the memory device 520 through the memory interface 530 and the host interface 550.

The ECC block 540 may be controlled by the host 510 to detect an error bit included in data output from the memory device 520 through the memory interface 530, correct the error bit, and transmit the error-corrected data to the host 510 through the host interface 550. The host 510 may control data communication among the memory interface 530, the ECC block 540, the host interface 550, and the memory device 520 through a bus 570. The system 50 may be implemented as a flash memory drive, a USB memory drive, an IC-USB memory drive, or a memory stick.

As described above, according to some example embodiments of the inventive concepts, a method of handling page faults in a non-volatile main memory system reduces the number of page faults, thereby reducing cost of switching user/kernel mode. In addition, when sequential pages are consecutively processed, some of the pages are processed synchronously and the remaining pages are processed asynchronously, so that time taken for a process to handle necessary commands is shortened. When a page fault occurs while some of the pages are being asynchronously processed, a ratio of asynchronously processed pages to synchronously processed pages is increased, decreased, or maintained, so that the page fault can be efficiently handled. Moreover, even when a page fault does not occur, a page is processed in advance using hint information, so that occurrence of a page fault is predicted and reduced.

While the inventive concepts have been particularly shown and described with reference to some example embodiments thereof, it will be understood by those of ordinary skill in the art that various changes in forms and details may be made therein without departing from the spirit and scope of the inventive concepts as defined by the following claims.

What is claimed is:

1. A method of handling a page fault occurring in a non-volatile main memory system, the method comprising:
analyzing a page fault occurrence pattern referring to previous page information having a page fault, in response to an occurrence of a page fault;
setting a first number of pages to be consecutively processed based on a result of the analyzing; and
consecutively processing as many pages as the first number,
wherein the consecutively processing includes
synchronously processing a second number of pages,
asynchronously processing a third number of pages, and
a sum of the second number of pages and the third number of pages is equal to the first number of pages to be consecutively processed.

2. The method of claim 1, wherein the analyzing includes determining whether the page fault occurrence pattern is sequential.

3. The method of claim 1, wherein the setting comprises:
increasing the first number in response to the page fault occurrence pattern being sequential; and
decreasing the first number in response to the page fault occurrence pattern being random.

4. The method of claim 1, wherein the synchronously processing is performed in a kernel mode.

5. The method of claim 4, wherein the asynchronously processing is performed in a user mode.

6. The method of claim 4, wherein the asynchronously processing comprises determining whether the page fault occurs each time one of the third number of pages is processed.

7. The method of claim 6, further comprising:
decreasing or maintaining a ratio of the third number of pages to the second number of pages in response to the page fault occurring while performing the asynchronously processing; and
increasing the ratio of the third number of pages to the second number of pages in response to the page fault not occurring while performing the asynchronously processing.

8. The method of claim 1, further comprising:
determining whether the page fault has occurred before the analyzing.

9. The method of claim 8, further comprising:
predicting page fault occurrence using hint information, the hint information obtained from a system call in response to a non-occurrence of the page fault;
setting a fourth number of pages to be consecutively processed based on the hint information; and
consecutively processing as many pages as the fourth number.

10. A method of handling a page fault occurring in a non-volatile main memory system, the method comprising:
setting a first number of pages to be consecutively processed based on a result of analyzing a page fault occurrence pattern referring to previous page information having a page fault, in response to an occurrence of a page fault;
synchronously processing a second number of pages; and
asynchronously processing a third number of the pages,
wherein a sum of the second number of pages and the third number of pages is equal to the first number of pages to be consecutively processed.

11. The method of claim 10, wherein the analyzing the page fault occurrence pattern includes determining whether the page fault occurrence pattern is sequential.

12. The method of claim 10, wherein the setting comprises:
increasing the first number of pages to be consecutively processed in response to the page fault occurrence pattern being sequential; and
decreasing the first number of pages to be consecutively processed in response to the page fault occurrence pattern being random.

13. The method of claim 10, wherein the synchronously processing is performed in a kernel mode, and the asynchronously processing is performed in a user mode.

14. The method of claim 10, wherein the non-volatile main memory system comprises a memory cell array, and the memory cell array comprises three-dimensional memory cells.

15. A method of handling a page fault occurring in a non-volatile main memory system, the method comprising:
- determining whether a page fault has occurred;
- analyzing a page fault occurrence pattern referring to previous page information having a page fault to determine whether the page fault occurrence pattern is sequential, in response to a result of the determining indicating that the page fault has occurred;
- setting a first number of pages to be consecutively processed based on a result of the analyzing; and
- consecutively processing as many pages as the first number,
- wherein the consecutively processing includes
  - synchronously processing a second number of pages,
  - asynchronously processing a third number of pages, and
  - a sum of the second number of pages and the third number of pages is equal to the first number of pages to be consecutively processed.

16. The method of claim 15, further comprising:
- decreasing or maintaining a ratio of the third number of pages to the second number of pages in response to the page fault occurring while performing the asynchronously processing; and
- increasing the ratio of the third number of pages to the second number of pages in response to the page fault not occurring while performing the asynchronously processing.

17. The method of claim 15, wherein the first number is set based on a plurality of predefined data states.

18. The method of claim 15 further comprising:
- predicting page fault occurrence using hint information, the hint information obtained from a system call in response to a non-occurrence of the page fault;
- setting a second number of pages to be consecutively processed ages based on the hint information; and
- consecutively processing as many pages as the second number.

* * * * *